(12) United States Patent
Muroyama

(10) Patent No.: US 9,032,144 B2
(45) Date of Patent: May 12, 2015

(54) VIRTUAL TAPE DEVICE, VIRTUAL LIBRARY SYSTEM, AND VIRTUAL TAPE CONTROL METHOD

(75) Inventor: Tomohiko Muroyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 534 days.

(21) Appl. No.: 12/659,809

(22) Filed: Mar. 22, 2010

(65) Prior Publication Data

US 2010/0185813 A1 Jul. 22, 2010

Related U.S. Application Data

(63) Continuation of application No. PCT/JP2007/069073, filed on Sep. 28, 2007.

(51) Int. Cl.
| G06F 12/00 | (2006.01) |
| G06F 13/00 | (2006.01) |
| G06F 13/28 | (2006.01) |
| G06F 11/16 | (2006.01) |
| G06F 3/06 | (2006.01) |
| G06F 11/20 | (2006.01) |

(52) U.S. Cl.
CPC .......... *G06F 11/1658* (2013.01); *G06F 3/0619* (2013.01); *G06F 3/0647* (2013.01); *G06F 3/067* (2013.01); *G06F 3/0686* (2013.01); *G06F 11/2097* (2013.01)

(58) Field of Classification Search
CPC . G06F 3/0686; G06F 3/0682; G06F 11/1658; G06F 3/0619; G06F 3/0647; G06F 3/067; G06F 11/2097

USPC .................................................. 711/161–162
See application file for complete search history.

(56) References Cited

U.S. PATENT DOCUMENTS

| 6,336,172 B1 * | 1/2002 | Day et al. ...................... 711/161 |
| 7,165,158 B1 | 1/2007 | Yagawa |
| 2002/0138705 A1 | 9/2002 | Suzuki et al. |
| 2003/0115225 A1 | 6/2003 | Suzuki et al. |
| 2003/0214744 A1 | 11/2003 | Ishii et al. |
| 2004/0044826 A1 * | 3/2004 | Dawson et al. ................... 711/4 |
| 2004/0243777 A1 | 12/2004 | Suzuki et al. |
| 2005/0210078 A1 | 9/2005 | Maruyama et al. |

(Continued)

FOREIGN PATENT DOCUMENTS

JP 11-102262 4/1999

(Continued)

OTHER PUBLICATIONS

G.T. Kishi, "The IBM Virtual Tape Server: Making tape controllers more autonomic", 2003, IBM Journal of Research and Development, vol. 47, Issue 4, pp. 459-469.*
International Search Report for PCT/JP2007/069073, mailed on Dec. 25, 2007.

*Primary Examiner* — Yaima Rigol
(74) *Attorney, Agent, or Firm* — Staas & Halsey LLP

(57) ABSTRACT

A virtual tape control method for controlling a virtual tape device includes performing a migration process for storing data stored in a logical volume to a physical volume of a library device belonging to the virtual tape device, and automatically extracting the data stored in the logical volume on which the migration process is completed at the performing, and exporting the data to a physical volume of a library device of a sub-center via a network.

8 Claims, 7 Drawing Sheets

(56) References Cited

U.S. PATENT DOCUMENTS

| | | |
|---|---|---|
| 2006/0026452 A1 | 2/2006 | Suzuki et al. |
| 2006/0101200 A1 | 5/2006 | Doi |
| 2006/0123213 A1* | 6/2006 | Kasako .................... 711/162 |
| 2006/0143376 A1* | 6/2006 | Matze et al. ............... 711/111 |
| 2006/0200623 A1* | 9/2006 | Gonzalez et al. .......... 711/111 |
| 2007/0079099 A1 | 4/2007 | Eguchi |
| 2007/0186067 A1 | 8/2007 | Nagata et al. |
| 2008/0250197 A1* | 10/2008 | Daily et al. ............... 711/111 |

FOREIGN PATENT DOCUMENTS

| | | |
|---|---|---|
| JP | 11-272427 | 10/1999 |
| JP | 2003-337660 | 11/2003 |
| JP | 2005-267216 | 9/2005 |
| JP | 2006-048103 | 2/2006 |
| JP | 2006-134217 | 5/2006 |
| JP | 2007-052772 | 3/2007 |
| JP | 2007-102455 | 4/2007 |
| JP | 2007-213345 | 8/2007 |

* cited by examiner

RELATED ART    FIG.6

VIRTUAL TAPE DEVICE, VIRTUAL LIBRARY SYSTEM, AND VIRTUAL TAPE CONTROL METHOD

CROSS-REFERENCE TO RELATED APPLICATION(S)

This application is a continuation of International Application No. PCT/JP2007/69073, filed on Sep. 28, 2007, the entire contents of which are incorporated herein by reference.

FIELD

The embodiments discussed herein are directed to a virtual tape device, a virtual library system, and a virtual tape control method for exporting data stored in a logical volume to a physical volume of a library device.

BACKGROUND

Conventionally, in a library system, as illustrated in FIG. 6, a host directly controls a robot path to control mounting or unmounting of a storage medium (for example, a tape medium), and reads or writes data via a physical drive in a library device (i.e., tape library).

Virtual library systems have been widely used that include a virtual tape device arranged between a host and a library device. The virtual tape device provides a logical drive and a logical volume to the host to read data from the host or write data more quickly (see Japanese Laid-open Patent Publication No. 11-102262). Specifically, in a virtual library system, data stored in a logical volume is retained in a cache disk, and then a migration process is performed for storing, in a physical volume of a library device, the data stored in the logical volume not in synchronization with a host access. The logical volume saved in the physical volume in the library device is retained as long as the capacity of the cache disk permits.

There is a demand that, to prevent a data loss due to a disaster, such a virtual library system has a redundant configuration including a main center and a sub-center and data is synchronized between the main center and sub-center (see Japanese Laid-open Patent Publication No. 2005-267216 and Japanese Laid-open Patent Publication No. 2006-48103).

Among methods for synchronizing data between a main center and a sub-center, for example, a technology is known in which a portable medium is transferred to the sub-center to synchronize data between the main center and the sub-center. Specifically, as illustrated in FIG. 7, data is synchronized between the main center and the sub-center in a way that an export process for saving data stored in a logical volume in a physical volume in a library device is performed in the main center, the storage medium of the library device is then transferred to the external sub-center, and an import process is performed for importing the data stored in the physical volume in the transferred storage medium to a logical volume of the sub-center.

As a method of synchronizing data between a main center and a sub-center, a technology is also known for synchronizing data between a main center and a sub-center by performing a data triple saving process. Specifically, as illustrated in FIG. 8, data triple saving is performed in a way that a library device is arranged in the sub-center and a migration process using a logical volume in a virtual tape device of the main center is performed as required on the physical volumes in the library devices of the main center and the sub-center. If a disaster occurs in the main center, the sub-center performs a disaster recovery to synchronize data between the main center and the sub-center.

In the technology for synchronizing data between the main center and the sub-center by transferring the portable medium to the sub-center, however, because recovery is performed by performing the import process on the data of the storage medium that has undergone the export process and has been transferred, the export process cannot be performed after the transfer. This leads to a problem in that data retained from the time when the process is performed to the time when a disaster occurs in the main center is lost. This also leads to a problem in that costs are incurred and time is required for transferring the portable medium on which the export process has been performed.

In the technology for synchronizing data between the main center and the sub-center by performing the data triple saving process, the migration process for reflecting an update of the logical volume in the virtual tape device in the physical volume in the library device is performed as required. This leads to a problem that, if a disaster occurs in the main center during the migration process, the update of the logical volume in the virtual tape device is not completely reflected in the physical volumes of the library devices in both the main center and the sub-center, and thus data is lost.

SUMMARY

According to an aspect of an embodiment of the invention, a virtual tape device of a main center includes: a logical volume that stores data received from a host computer; a migration unit that performs a migration process in the main center for storing the data stored in the logical volume, in a physical volume of a library device which is arranged in the main center and connected to the virtual tape device; and an export unit that exports the data stored in the logical volume, on which the migration process is completed by the migration unit, to a physical volume of a library device of a sub-center via a network, the library device of the sub-center being connected to a virtual tape device of the sub-center.

According to another aspect of an embodiment of the invention, a virtual tape device of a sub-center includes: a logical volume for storing data; an import unit that imports the data exported by the export unit of the virtual tape device according to claim 1 and stored in the physical volume of the library device of the sub-center to the logical volume of the virtual tape device of the sub-center, the library device of the sub-center being subordinate to the virtual tape device of the sub-center and connected to the virtual tape device of the main center via a network; and a migration unit that, after the import unit completes the importing, performs a migration process for migrating the data stored in the logical volume by the importing to a physical volume different from the physical volume to which the data is exported by the export unit.

According to still another aspect of an embodiment of the invention, a virtual library system includes: a virtual tape device of a main center, the virtual tape device being connected to a library device subordinate to the virtual tape device of the main center, being connected via a network to a library device connected to a virtual tape device of a sub-center, including a logical volume for storing data received from a host computer, and exporting the data stored in the logical volume to a physical volume of the library device; and a virtual tape device of the sub-center, the virtual tape device of the sub-center subordinating a library device connected to the virtual tape device of the main-center via a network, wherein the virtual tape device of the main center includes a migration unit of the main center, the migration unit performing a migration process for storing the data stored in the logical volume to a physical volume of the library device belonging to the virtual tape device of the main center; and an export unit that exports the data stored in the logical volume on which the migration process is completed by the migration unit to the physical volume of the library device of the sub-center via the network.

According to still another aspect of an embodiment of the invention, a virtual tape control method for controlling a virtual tape device includes: performing a migration process for storing data stored in a logical volume to a physical volume of a library device belonging to the virtual tape device; and automatically extracting the data stored in the logical volume on which the migration process is completed at the performing, and exporting the data to a physical volume of a library device of a sub-center via a network.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings.

[a] First Embodiment

Regarding the embodiment, an overview and features of a virtual library system according to a first embodiment and a configuration and a process flow of a virtual tape device according to the first embodiment are explained in sequence and effects of the first embodiment are explained lastly.

Overview and Features of Virtual Library System According to First Embodiment

Figure 1:
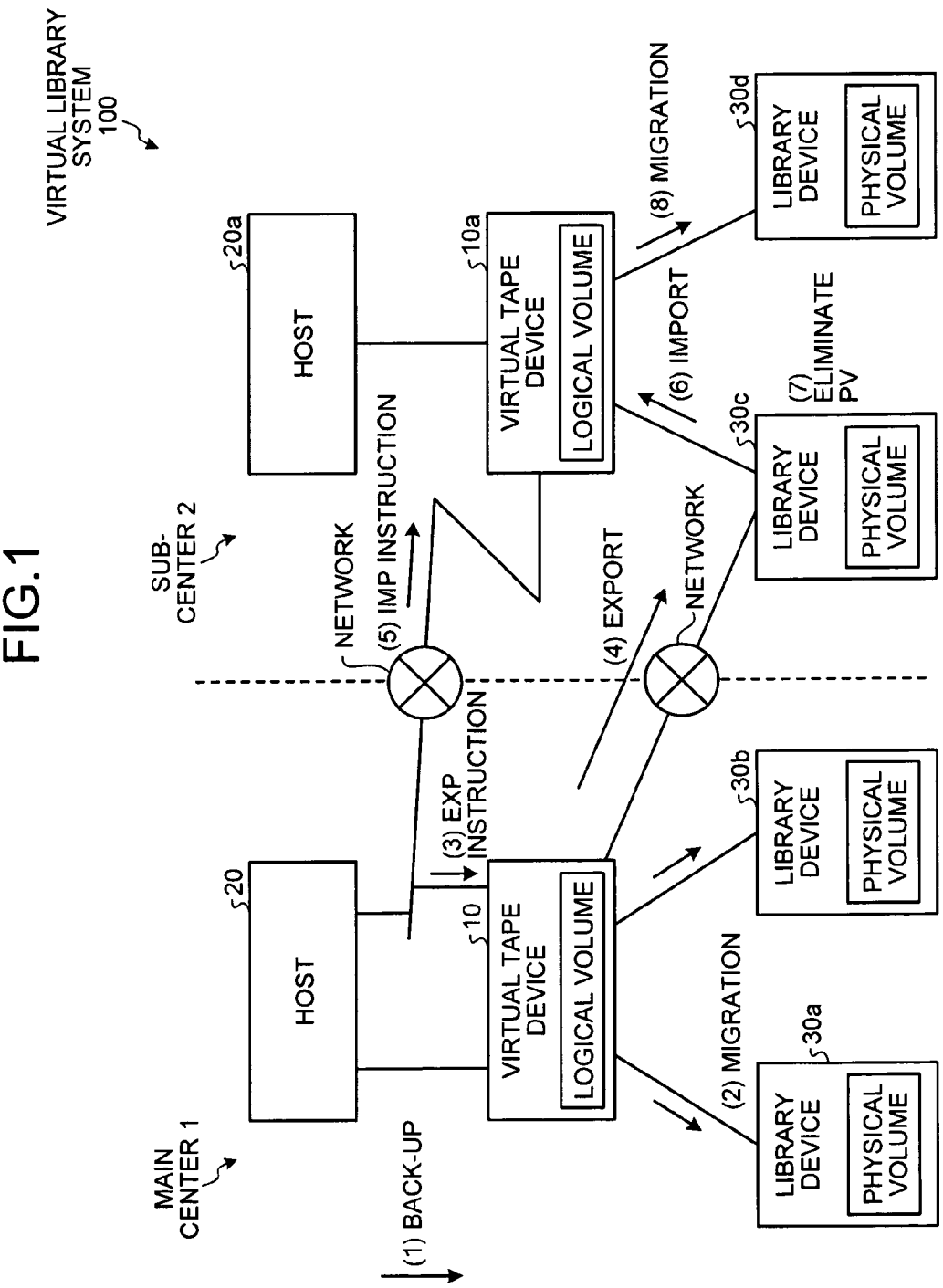
FIG. 1 is a diagram for explaining an overview and features of a virtual library system according to a first embodiment.

Firstly, an overview and features of the virtual library system according to the first embodiment are explained with reference to FIG. 1. FIG. 1 is a diagram for explaining the overview and features of the virtual library system according to the first embodiment.

The overview of a virtual library system 100 of the first embodiment is that data stored in a logical volume is exported to a physical volume of a library device. The features of the virtual library system 100 are in that costs and time for transferring a library device are reduced and a data loss is prevented.

The main feature is specifically explained below. As illustrated in FIG. 1, the virtual library system 100 according to the first embodiment includes a virtual tape device 10 in a main center 1, and a virtual tape device 10a in a sub-center 2. The virtual tape device 10 is connected to library devices 30a and 30b subordinate to the virtual tape device 10. Further, the virtual tape device 10 is connected to a library device 30c belonging to the virtual tape device 10a of the sub-center 2 via a network. The virtual tape device 10 includes a logical volume for storing data received from a host computer (hereinafter also referred to as "host") 20, and exports data stored in the logical volume to a physical volume of the library device 30c. The virtual tape device 10a of the sub-center 2 subordinates the library device 30c that is connected to the virtual tape device 10 of the main center 1 via the network, and a library device 30d that is not connected to the virtual tape device 10 of the main center 1 via the network.

In such a configuration, when the virtual tape device 10 of the virtual library system 100 receives a request for writing data as a back-up process (see (1) of FIG. 1), the virtual tape device 10 performs a migration process for storing data stored in the logical volume in physical volumes in library devices 30a and 30b that belong to the virtual tape device 10 (see (2) of FIG. 1).

Subsequently, once the host 20 gives the virtual tape device 10 an export instruction (see (3) of FIG. 1), the virtual tape device 10 exports the data stored in the logical volume on which the migration process has been completed to the physical volume of the library device 30c of the sub-center 2 (see (4) of FIG. 1) via the network.

In other words, because the virtual tape device 10 of the main center 1 performs the export to the physical volume of the library device 30c of the sub-center 2 via the network, the export can be carried out without transferring a library device. In addition, after the virtual tape device 10 of the main center 1 completes migration, the virtual tape device 10 exports the data stored in the logical volume to the physical volume of the library device 30c of the sub-center 2. Therefore, even if an accident occurs in the virtual tape device 10 of the main center 1 and the process for export to a physical volume of the library device 30c of the sub-center 2 is not normally completed, tape medium on which the migration is normally completed exist in the library devices 30a and 30b of the main center 1.

Back to the explanation on FIG. 1, the host 20 then gives an import instruction to the virtual tape device 10a of the sub-center 2 (see (5) of FIG. 1). The virtual tape device 10a that receives the import instruction imports the exported data stored in the physical volume of the library device 30c of the sub-center 2 to a logical volume (see (6) of FIG. 1).

After the import process, the virtual tape device 10a cancels allocation of the physical volume of the library device 30c (see (7) of FIG. 1), data in which has been imported. After the import is completed, the virtual tape device 10a performs a migration process of the data imported and stored in the logical volume to a physical volume of the library device 30d (see (8) of FIG. 1). The library device 30d is different from the library device 30c to which the data is exported. Even when it is difficult for the virtual tape device 10 of the main center 1 to perform restoration, the sub-center 2 can keep the data in the library device 30d as it is at the time when the migration process is completed. Therefore the virtual tape device 10a of the sub-center 2 can perform a recovery process.

Thus, as can bee understood from the main features described above, the virtual library system 100 can reduce costs and time for transferring a library device and prevents a data loss.

Configuration of Virtual Library System

Figure 2:
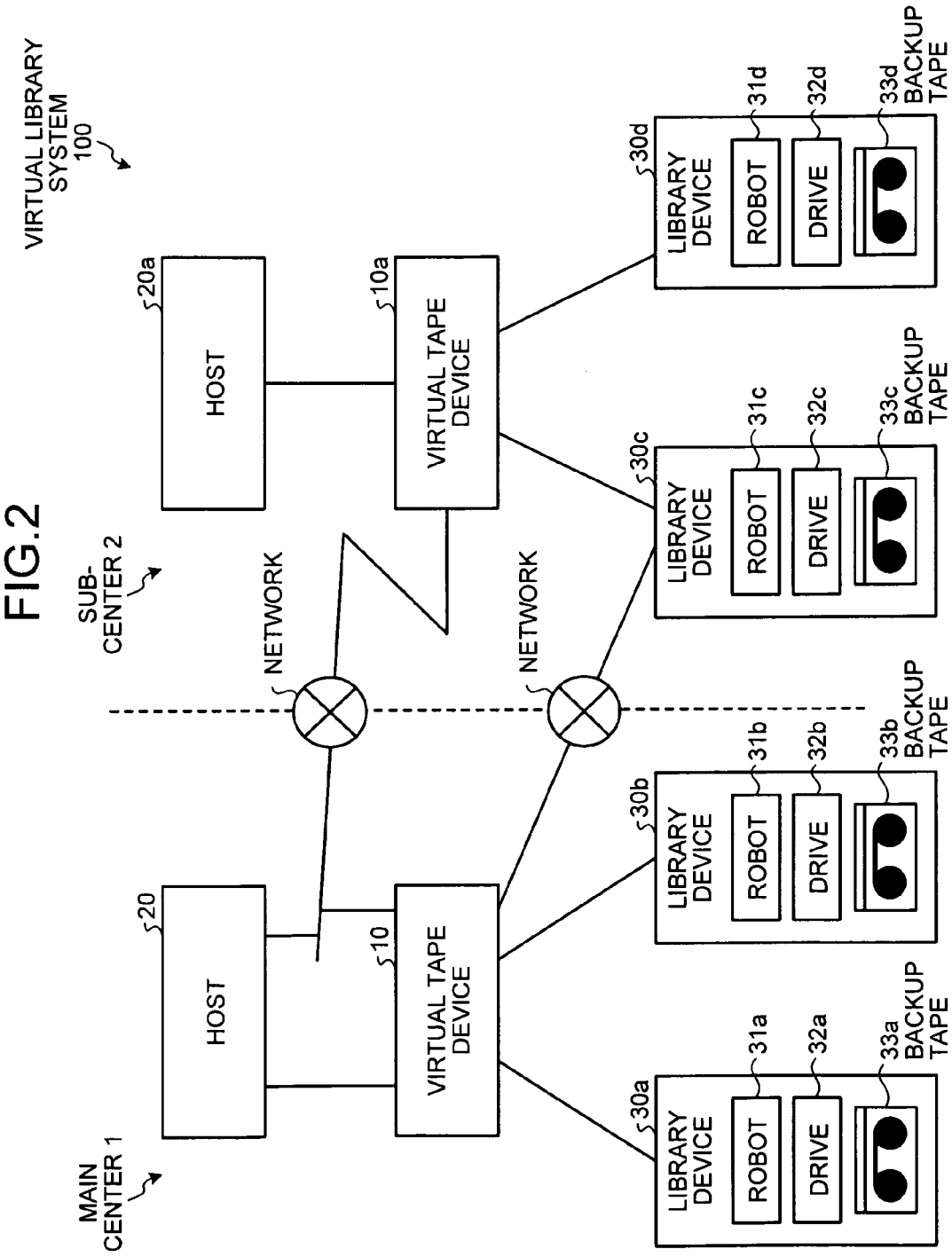
FIG. 2 is a block diagram illustrating a configuration of the virtual library system according to the first embodiment.

The configuration of the virtual library system 100 illustrated in FIG. 1 is explained with reference to FIG. 2. FIG. 2 is a block diagram illustrating the configuration of the virtual library system 100 according to the first embodiment.

As illustrated in FIG. 2, the virtual library system 100 has a redundant configuration including the main center 1 and the sub-center 2. The main center 1 includes the virtual tape device 10, the host 20, and the library devices 30a and 30b, whereas the sub-center 2 includes the virtual tape device 10a, the host 20a, and the library devices 30c and 30d. The virtual tape device 10 of the main center 1 is connected to the library device 30c of the sub-center 2 via the network, and the host 20 of the main center 1 is connected to the virtual tape device 10a of the sub-center 2 via the network.

The host 20 is connected to the virtual tape device 10 via a network such as a LAN and gives the virtual tape device a request for writing data, an export instruction, and an import instruction as a backup process. The library devices 30a, 30b, 30c, and 30d respectively include robots 31a, 31b, 31c, and 31d that respectively load backup tapes 33a, 33b, 33c, and 33d, and drives 32a, 32b, 32c, and 32d that write data. The library devices 30a to 30d are connected to one or both of the virtual tape devices 10 and 10a via a bus or the like.

Configuration of Virtual Tape Device

Figure 3:
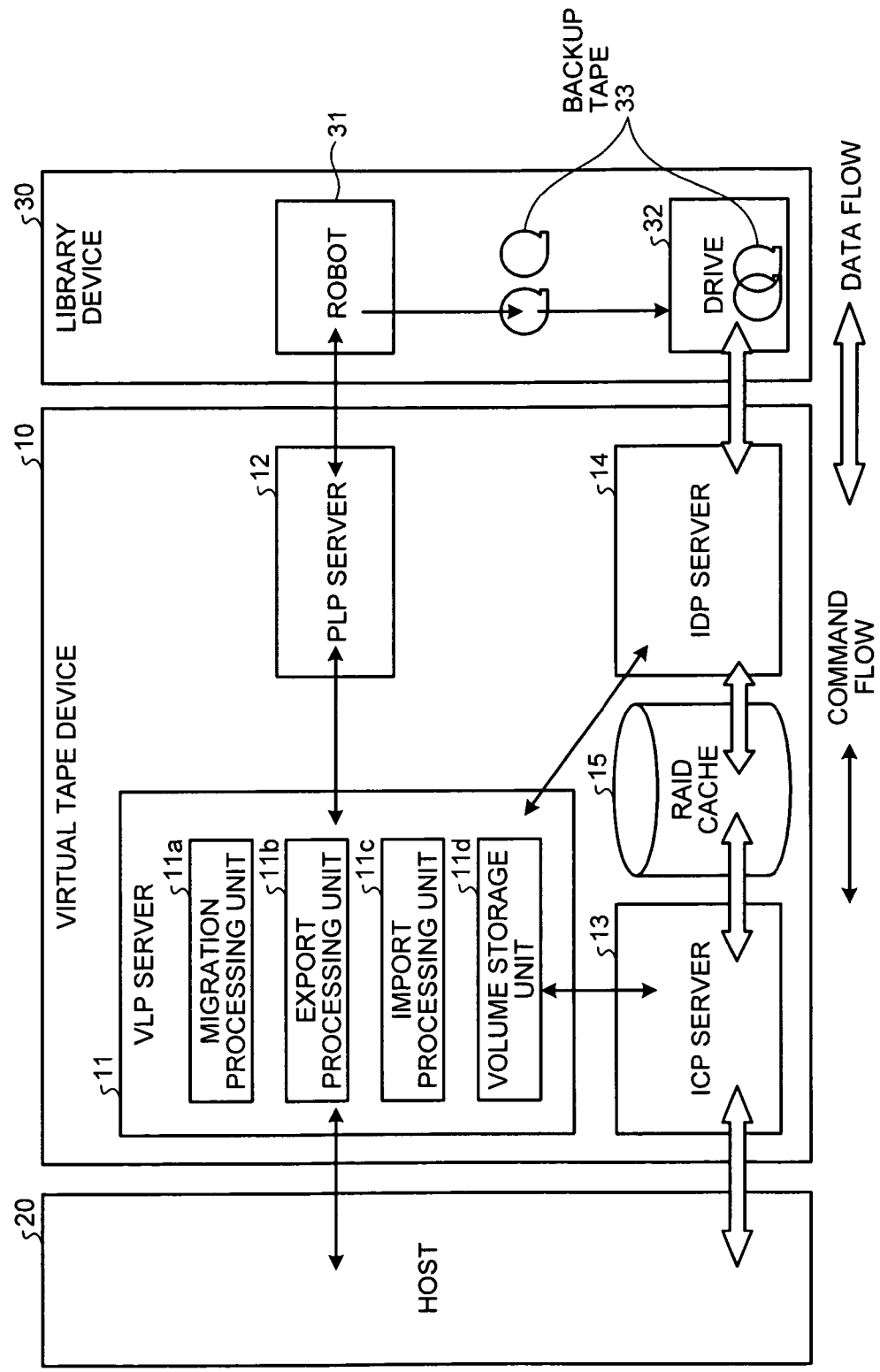
FIG. 3 is a block diagram illustrating a configuration of a virtual tape device according to the first embodiment.

A configuration of the virtual tape device 10 illustrated in FIG. 1 is explained below with reference to FIG. 3. FIG. 3 is a block diagram illustrating the configuration of the virtual tape device 10 according to the first embodiment. As illustrated in FIG. 3, the virtual tape device 10 includes a virtual library processor (VLP) server 11, a physical library processor (PLP) server 12, an integrated channel processor (ICP) server 13, an integrated device processor (IDP) server 14, and a RAID cache 15. The virtual tape device 10 is connected to the host 20 and the library device 30 via the network. The virtual tape device 10 of the main center 1 is connected to the library device 30 of the sub-center 2 via the network. The process of each unit is explained below.

The RAID cache 15 includes a logical volume as a memory area, includes a disk device, uses the disk device as a primary cache to enable a quick response to the host 20.

The VLP server 11 is connected to the host 20 via a network, and receives a request such as a mounting request from the host 20. Thereafter, the VLP server 11 issues requests for controlling the logical volume or the logical drive to the ICP server 13 as required and issues requests for controlling the physical tape or the physical drive to the IDP server 14. The VLP server 11 includes a migration processing unit 11a, an export processing unit 11b, an import processing unit 11c, and a volume storage unit 11d as units that are particularly related closely to the present invention.

In response to an instruction from the VLP server 11, the PLP server 12 controls the robot 31 of the library device 30 to mount the physical volume on the drive 32 or unmount the physical volume from the drive 32 in the library device 30.

The ICP server 13 mounts a channel interface card. The ICP server 13 is connected to the host 20 via an FC link or an OC link. The ICP server 13 reads or writes LV data on the cache in response to a request from the host 20.

The IDP server 14 has a data path to the library device 30 and performs a process for storing in a library data stored in the logical volume on the RAID cache 15 or restoring on the RAID cache 15 data read from the tape by the import process in response to an instruction from the VLP server.

Figure 4:
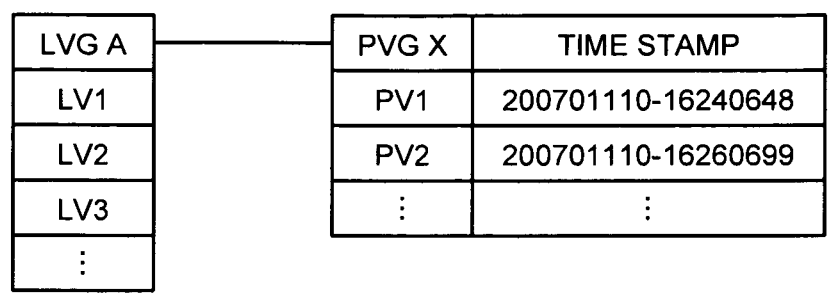
FIG. 4 is a diagram for explaining a volume storage unit illustrated in FIG. 3.

The volume storage unit 11d stores a physical volume group and a logical volume group, which are used for export, in association with each other. Specifically, as illustrated in FIG. 4, the volume storage unit 11d stores the logical volume group (LVG in FIG. 4) and the physical volume group (PVG in FIG. 4) in association with each other and further stores a time at which a physical volume is registered in a PVG as a time stamp. In the virtual tape device 10 of the main center, a physical volume for export (the physical volume in the library device 30c in the sub-center 2 in the example of FIG. 1) is stored as a physical volume.

The migration processing unit 11a controls the migration process for storing, in the physical volume of the library device 30 belonging to the own virtual tape device 10, data stored in the logical volume. Specifically, once data is written in the logical volume, the migration processing unit 11a automatically performs the migration process on the logical volume not in synchronization with the host access. In the sub-center 2, after the import processing unit 11c performs the import process and cancels the allocation of the physical volume subjected to the import process, the migration processing unit 11a performs the migration process on the logical volume.

In the main center 1, when the number of logical volumes changed by completing the migration process reaches or exceeds a predetermined number, the export processing unit 11b exports the stored data to the physical volume of the library device 30c of the sub-center 2 via the network. In other words, the export processing unit 11b automatically extracts a logical volume on which the migration process is completed at a predetermined time interval, and determines whether the number of logical volumes that belong to an arbitrary LVG and updated after a specified date or after the latest date of migration execution stored in hardware reaches a specified threshold or a predetermined threshold corresponding to a type of a back-end drive. If the number of the logical volumes exceeds the threshold, the export processing unit 11b exports the data stored in the logical volume, which is an export subject, via the network to the physical volume of the library device of the sub-center.

Specifically, when the export processing unit 11b in the main center 1 receives an export instruction and designation of an export target, i.e., a physical volume in the library device 30c of the sub-center 2, the export processing unit 11b performs the export process to export data in the logical volume to the library device 30c of the sub-center 2.

The physical volume specified by the host 20 is the physical volume for export that is stored in the volume storage unit 11d, and has the oldest time stamp. Physical volumes are specified in rotation to reduce the wear of the backup tape.

After the export process is completed, the export processing unit 11b cancels the allocation of the physical volume which is an export target, from the volume storage unit 11d and notifies the host 20 of the completion of the export process.

In the sub-center 2, the import processing unit 11c imports, to the logical volume, the data exported from the main center 1 and stored in the physical volume of the library device 30c of the sub-center 2. Specifically, when the import processing unit 11c receives an import instruction from the host 20, the import processing unit 11c registers the allocation of a physical volume, for which the import process is to be performed, and performs the import process to import the physical volume, which is an import subject, to the logical volume in the RAID cache 15. In the sub-center 2, after the import process, the import processing unit 11c cancels the allocation of the physical volume of the library device 30c, which is the import process subject.

The import processing unit 11c of the sub-center 2 notifies the host 20 of the main center 1 of the completion of the import process. When the virtual tape device 10 in the main center 1 receives a notification of the completion of the import process from the host 20, the export processing unit 11b re-registers the allocation of the physical volume of the library device 30c, which is an export process subject, in the volume storage unit 11d. When the physical volume is re-registered, a time stamp is newly provided.

Process by Virtual Library System

Figure 5:
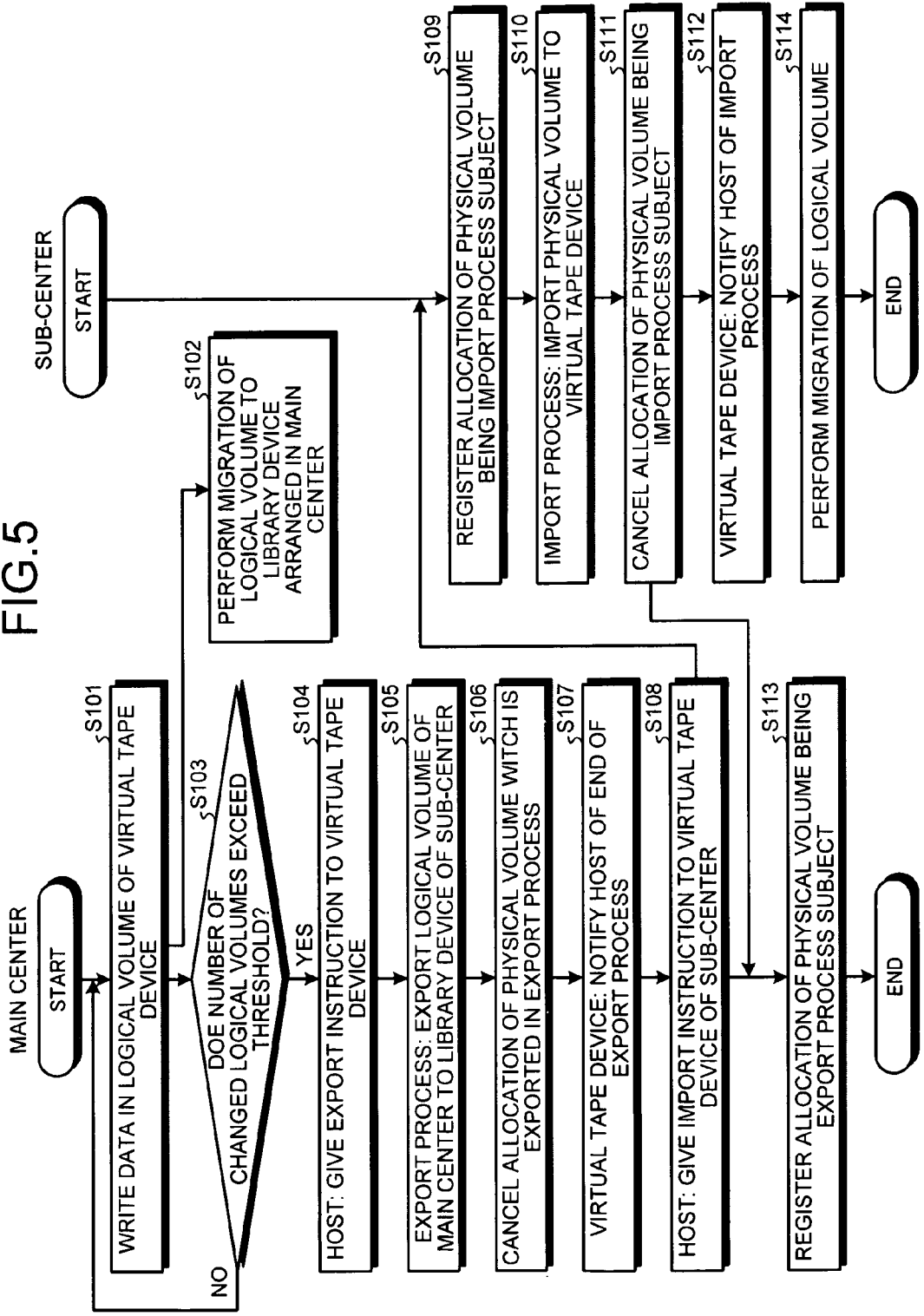
FIG. 5 is a flowchart illustrating a flow of a process performed by the virtual library system according to the first embodiment.
Figure 6:
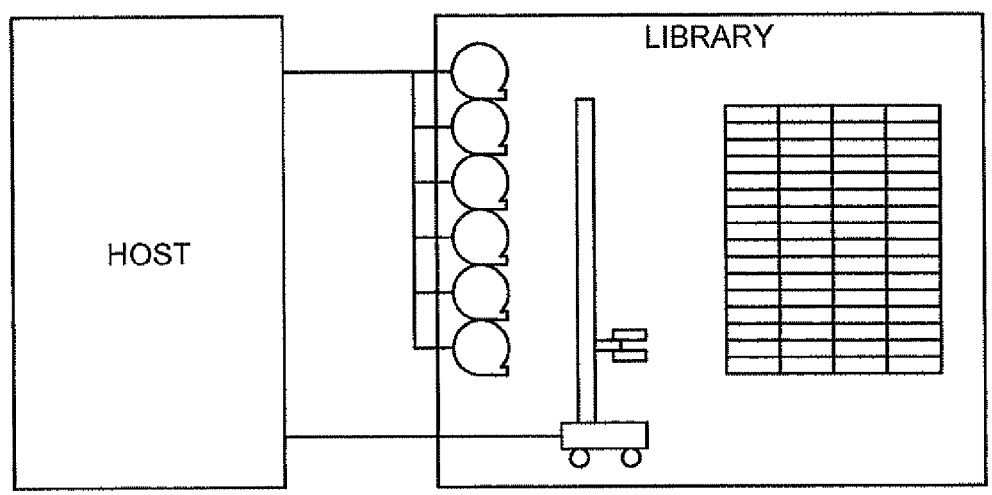
FIG. 6 is a diagram for explaining a conventional technology.
Figure 7:
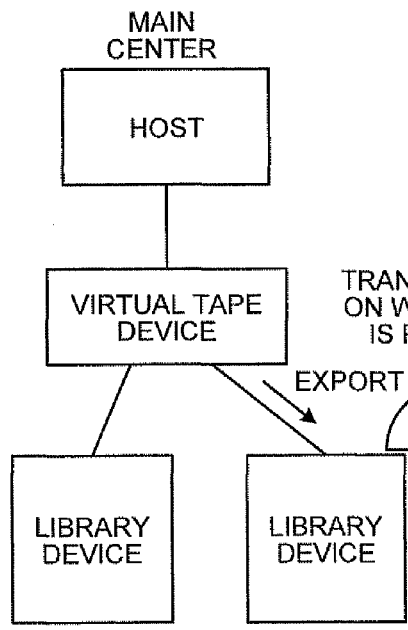
FIG. 7 is a diagram for explaining a conventional technology.
Figure 8:
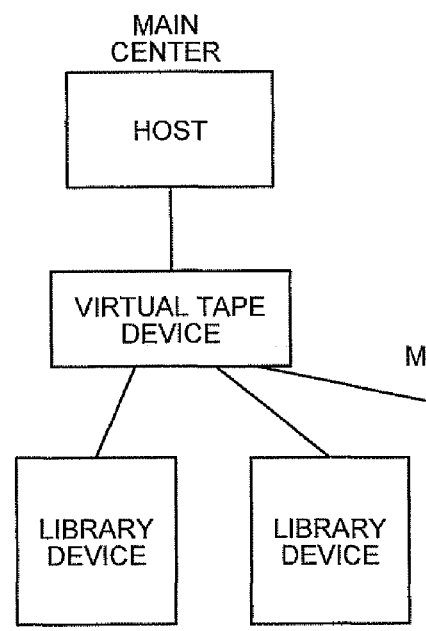
FIG. 8 is a diagram for explaining a conventional technology.

The virtual library system 100 according to the first embodiment is explained below with reference to FIG. 5. FIG. 5 is a flowchart of the flow of a process performed by the virtual library system 100 according to the first embodiment.

As illustrated in FIG. 5, in the virtual tape device 10, data is written in the logical volume (step S101). After completion of data writing in the logical volume, the virtual tape device 10 notifies the host 20 of the completion of the data writing and then automatically performs the process of migration of the logical volume not in synchronization with a host access (step S102). In synchronization with the process of migration to the library device of the main center, the virtual tape device 10 extracts the changed logical volume at an arbitrary interval to monitor the number of changed logical volumes (step S103).

Subsequently, after the virtual tape device 10 confirms that the number of changed logical volumes reaches or exceeds the threshold, the host 20 gives an export instruction to the virtual tape device 10 (step S104) and the virtual tape device 10 performs the export process to export the changed logical volumes of the main center 1, which is an export subject, to the logical volume of the library device 30c of the sub-center 2 (step S105). After the completion of the export process, the virtual tape device 10 cancels the allocation of the physical volume, which is an export process subject (step S106), and notifies the host 20 of the end of the export process (step S107).

Thereafter, the host 20 gives an import instruction to the virtual tape device 10a of the sub-center 2 (step S108). Upon receiving the import instruction, the virtual tape device 10a registers the allocation of the physical volume, which is an import subject (step S109), and performs the import process to import from the physical volume, which is an import process subject, to the logical volume of the virtual tape device 10a (step S110).

After the import process, the virtual tape device 10a cancels allocation of the physical volume of the library device 30c, which is the import process subject (step S111).

Subsequently, the virtual tape device 10a notifies the host 20 of the main center 1 of the end of the import process (step S112). The host 20 of the main center 1, which has received the notification, notifies the virtual tape device 10 of the end of the import process, and the virtual tape device 10 re-registers the physical volume of the library device 30c, which is the export process target, in the PVG used for export (step S113). In the sub-center, migration of the logical volume is performed (step S114).

Effect of First Example

As described above, in the virtual library system 100, because the virtual tape device of the main center performs export to the physical volume of the library device of the sub-center via the network, export is performed without transferring a library device. This prevents a loss of data that is retained from the time when the export process is performed up to the time when a disaster occurs in the main center, and reduces costs and time for transferring a library device.

In the first embodiment, in the virtual library system 100, after the virtual tape device of the main center completes the migration, the virtual library system 100 exports the data stored in the logical volume to the physical volume of the library device of the sub-center. Therefore, even if an accident occurs in the virtual tape device of the main center and the process for export to the library device of the sub-center is not completed normally, there is a tape medium to which data migration is normally finished in the library device of the main center. This enables the main center to restore the state before the accident occurs to prevent a data loss.

In the first embodiment, even if restoration is difficult in the virtual tape device of the main center, the sub-center retains the data at the time when the migration process is completed. This enables a recovery process in the virtual tape device of the sub-center.

[b] Second Embodiment

The embodiment of the present invention is explained above. The present invention may be carried out in various different embodiments other than the above-described embodiment. Other embodiments of the present invention are explained below as a second embodiment.

Among the processes explained in the above embodiment, the process that is explained as one automatically performed may be performed manually entirely or partly. Alternatively, the process explained as one performed manually may be performed automatically entirely or partly with a known method. In addition, the process procedures, the control procedures, the specific names, and information including various types of data and parameters may be arbitrarily changed except for specified cases.

Each element of each device is functional and schematic and thus is not required to be physically configured as illustrated in the drawings. In other words, specific modes of dispersion or integration of the devices are not limited to those illustrated in the drawings. The devices may be configured in a way that they are entirely or partly dispersed or integrated functionally or physically based on an arbitrary unit depending on each type of load or use. Furthermore, the processing functions performed by the devices may be entirely or arbitrarily partly implemented by a CPU or a program that is analyzed and executed by the CPU, or may be implemented as wired logic hardware.

The virtual tape controlling method explained as the embodiment may be achieved by executing a prepared program on a computer such as a personal computer or a work station. The program may be distributed via a network such as the Internet. The program may be recorded in a computer-readable recording medium, such as a hard disk, a flexible disk (FD), a CD-ROM, an MO, and a DVD, and may be read from such a recording medium by a computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A virtual tape device arranged in a main center comprising:
   a logical volume that stores data received from a host computer, the logical volume being coupled to a first library device arranged in the main center and the logical volume also being coupled, via a network, to a second library device, the second library device being arranged in a sub center and coupled to a second virtual tape device arranged in the sub center, the received data synchronized between the logical volume of the virtual tape device arranged in the main center and a logical volume of the second virtual tape device;
   a migration unit that performs a migration process which stores the data stored in the logical volume of the virtual tape device in the main center, in a physical volume of the first library device;
   an export unit that exports, when receiving an export instruction and designation of a physical volume of the second library device in the sub center from the host computer, the data stored in the logical volume of the virtual tape device in the main center, on which the migration process is completed by the migration unit, to the physical volume of the second library device via the network, so as to import the data exported in the second library device to the logical volume of the second virtual tape device for synchronization, and
   a volume storage unit that stores correspondence between the physical volume of the second library device and the logical volume of the virtual tape device of the main center,
   wherein the export unit cancels allocation of the physical volume from the volume storage unit after finishing exporting the logical volume to the physical volume of the second library device, and notifies the host computer of a completion of the exporting.

2. The virtual tape device according to claim 1, wherein the export unit automatically extracts the logical volume on which the migration process is completed by the migration unit, determines whether the number of extracted logical volumes exceeds a predetermined threshold or not, and when the number exceeds the predetermined threshold, exports the data stored in the logical volume to the physical volume of the second library device.

3. The virtual tape device according to claim 1, wherein, upon reception of a notification of completion of an import process from the second virtual tape device, the physical volume in the second library device, for which the notified, completed import process is performed to move the data to a logical volume of the second virtual tape device, is registered in the volume storage unit.

4. A virtual tape device of a sub center comprising:
   a logical volume that stores data, that is coupled to a second library device and a third library device arranged in the sub center;
   an import unit that registers, when receiving an import instruction from a host computer coupled to a first virtual tape device of a main center, an allocation of a physical volume of the second library device for which an import is to be performed, imports data exported to the physical volume of the second library device to the logical volume of the virtual tape device of the sub center, and cancels the allocation of the physical volume of the second library device after the import, the data in the physical volume of the second library device being exported from a logical volume of the first virtual tape device of the main center after the data is migrated from the logical volume of the first virtual tape device to a physical volume of a library device in the main center, data in the logical volume of the virtual tape device of the sub center being synchronized with data in the logical volume of the first virtual tape device; and
   a migration unit that performs a migration process which stores the data stored in the logical volume of the virtual tape device of the sub center in the importing, in a physical volume of the third library device which is coupled to the virtual tape device of the sub center but not directly to the first virtual tape device of the main center,
   the import unit notifies a host computer coupled to the first virtual tape device of the main center of a completion of the importing.

5. A virtual library system comprising:
   a first virtual tape device that is arranged in a main center and that is coupled to a first library device arranged in the main center and also coupled via a network to a second library device; and
   a second virtual tape device that is arranged in the sub center and that is coupled to the second library device arranged in the sub center, wherein
   the first virtual tape device includes
   a logical volume that stores data received from a host computer, the logical volume being coupled to the first library device and the logical volume also being coupled, via the network, to the second library device for storing data received from the host computer, the received data being synchronized between the logical volume of the first virtual tape device and a logical volume of the second virtual tape device;
   a migration unit that performs a migration process which stores the data stored in the logical volume of the first virtual tape device, in a physical volume of the first library device; and
   an export unit that exports, when receiving an export instruction and designation of a physical volume of the second library device in the subs center from the host computer, the data stored in the logical volume of the first virtual tape device, on which the migration process is completed by the migration unit, to the physical volume of the second library device via the network, so as to import the data exported in the second library device to the logical volume of the second virtual tape device for synchronization, and
   a volume storage unit that stores correspondence between the physical volume of the second library device and the logical volume of the virtual tape device of the main center,
   wherein the export unit cancels allocation of the physical volume from the volume storage unit after finishing exporting the logical volume to the physical volume of the second library device, and notifies the host computer of a completion of the exporting.

6. The virtual library system according to claim 5, wherein the logical volume of the second virtual tape device stores data, and is coupled to the second library device and a third library device arranged in the sub center;
   the second virtual tape device further includes
   an import unit that registers, when receiving an import instruction from a host computer coupled to a first virtual tape device of a main center, an allocation of a physical volume of the second library device for which an import is to be performed, imports the data exported to the physical volume of the second library device via the network by the export unit to the logical volume of the second virtual tape device, and cancels the allocation of the physical volume of the second library device after the import;

a migration unit that performs a migration process which stores the data stored in the logical volume of the second virtual tape device in the importing in a physical volume of the third library device which is coupled to the second virtual tape device of the sub center but not directly to the first virtual tape device of the main center, the import unit, after completing the importing, notifies the host computer of the first virtual library device of the completion of the importing.

7. A virtual tape control method for controlling a first virtual tape device and a second virtual device, the first virtual device being arranged in a main center, coupled to a first library device arranged in the main center and also coupled via a network to a second library device, the second library device being arranged in a sub center and coupled to the second virtual tape device, the virtual tape control method comprising:

storing data received from a host computer in a logical volume of the first virtual tape device, the logical volume of the first virtual tape device being coupled to the first library device and coupled via the network to the second library device for storing data received from the host computer, the received data being synchronized between the logical volume of the first virtual tape device and a logical volume of the second virtual tape device;

performing a migration process which stores the data stored in the logical volume of the first virtual tape device in a physical volume of the first library device;

extracting the data stored in the logical volume of the first virtual tape device on which the migration process is completed at the performing; and exporting, when receiving an export instruction and designation of a physical volume of the second library device in the sub center from the host computer, the data extracted in the extracting to the physical volume of the second library device via the network, so as to import the data exported in the second library device to the logical volume of the second virtual tape device for synchronization, and storing correspondence between the physical volume of the second library device and the logical volume of the first virtual tape device of the main center, wherein the exporting further cancels allocation of the physical volume from the volume storage unit after finishing exporting the logical volume to the physical volume of the second library device, and notifies the host computer of a completion of the exporting.

8. The virtual tape control method according to claim 7, further comprising registering, when receiving an import instruction from the host computer, an allocation of a physical volume of the second library device for which an import is to be performed, importing the data exported to the physical volume of the second library device at the exporting to the logical volume of the second virtual tape device, and cancelling the allocation of the physical volume of the second library device after the import, the logical volume of the second virtual tape device being coupled to the second library device and a third library device arranged in the sub center;

after the importing is completed, performing a migration process which stores the data stored in the logical volume of the second virtual tape device in the importing in a physical volume of a third library device which is coupled to the second virtual tape device but not directly to the first virtual tape device; and after the importing is completed, notifying the host computer of the first virtual library device of the completion of the importing.

* * * * *

UNITED STATES PATENT AND TRADEMARK OFFICE
CERTIFICATE OF CORRECTION

| | | |
|---|---|---|
| PATENT NO. | : 9,032,144 B2 | Page 1 of 1 |
| APPLICATION NO. | : 12/659809 | |
| DATED | : May 12, 2015 | |
| INVENTOR(S) | : Tomohiko Muroyama | |

It is certified that error appears in the above-identified patent and that said Letters Patent is hereby corrected as shown below:

In the claims

Claim 5, Column 10, Line 39

Delete "subs" and insert --sub--, therefor.

Signed and Sealed this
Thirteenth Day of October, 2015

Michelle K. Lee
*Director of the United States Patent and Trademark Office*